United States Patent
Lindsay et al.

(10) Patent No.: US 6,769,654 B2
(45) Date of Patent: Aug. 3, 2004

(54) SPREADER MECHANISMS FOR SUPPORTING TRIPOD LEGS

(75) Inventors: Richard Arthur Lindsay, Eye (GB); Andrew Derek Murrow, Bury St. Edmunds (GB)

(73) Assignee: The Vitec Group PLC, Suffolk (GB)

( * ) Notice: Subject to any disclaimer, the term of this patent is extended or adjusted under 35 U.S.C. 154(b) by 70 days.

(21) Appl. No.: 10/333,111

(22) PCT Filed: Jul. 16, 2001

(86) PCT No.: PCT/GB01/03179

§ 371 (c)(1), (2), (4) Date: Jan. 14, 2003

(87) PCT Pub. No.: WO02/06722

PCT Pub. Date: Jan. 24, 2001

(65) Prior Publication Data

US 2003/0150966 A1 Aug. 14, 2003

(30) Foreign Application Priority Data

Jul. 14, 2000 (GB) .............................. 0017410

(51) Int. Cl.[7] .............................................. F16M 11/20
(52) U.S. Cl. ................................... 248/188.7; 248/169
(58) Field of Search ........................ 248/163.1, 188.7, 248/171, 169, 187.1, 163

(56) References Cited

U.S. PATENT DOCUMENTS 4,324,477 A * 4/1982 Miyazaki .................. 248/163.1
4,570,886 A * 2/1986 Mooney .................... 248/186.1
4,648,697 A * 3/1987 Kawazoe .................. 248/163.1
5,341,185 A * 8/1994 Nakatani .................... 396/428

FOREIGN PATENT DOCUMENTS

| GB | 2 246 600 | 2/1992 |
| GB | 2 259 787 | 3/1993 |
| GB | 2 298 570 | 9/1996 |
| WO | WO 00/43709 | 7/2000 |

OTHER PUBLICATIONS

PCT International Search Report from International Application No. PCT/GB01/03179, Dated Oct. 10, 2001.
PCT International Preliminary Examination Report from International Application No. PCT/GB01/03179, Dated Apr. 22, 2002.

* cited by examiner

Primary Examiner—Leslie A. Braun
Assistant Examiner—Kofi Schulterbrandt
(74) Attorney, Agent, or Firm—Moser, Patterson & Sheridan, L.L.P.

(57) ABSTRACT

The disclosure relates to a spreader mechanism for supporting the legs (11) of a tripod erect, comprising a hub (13) having a central axis, three arms (14) pivotally mounted on the hub at positions equi-spaced around the hub to swing with respect to the hub axis between extended and folded positions. A drive mechanism (19, 22) coordinates movement of the arms so that all three arms remain in the same relationship to the hub axis throughout the range of movement of the arms, and a locking device (26, 29, 30, 31, 32) locks the drive mechanism against movement at any position throughout the range of movement of the arms. The locking device may be released held by a push button operated mechanism (50, 51, 36, 34) to allow adjustment of the spreader member and the holding means is deactivated to allow engagement of the locking device to lock the arms in a selected position of adjustment.

10 Claims, 2 Drawing Sheets

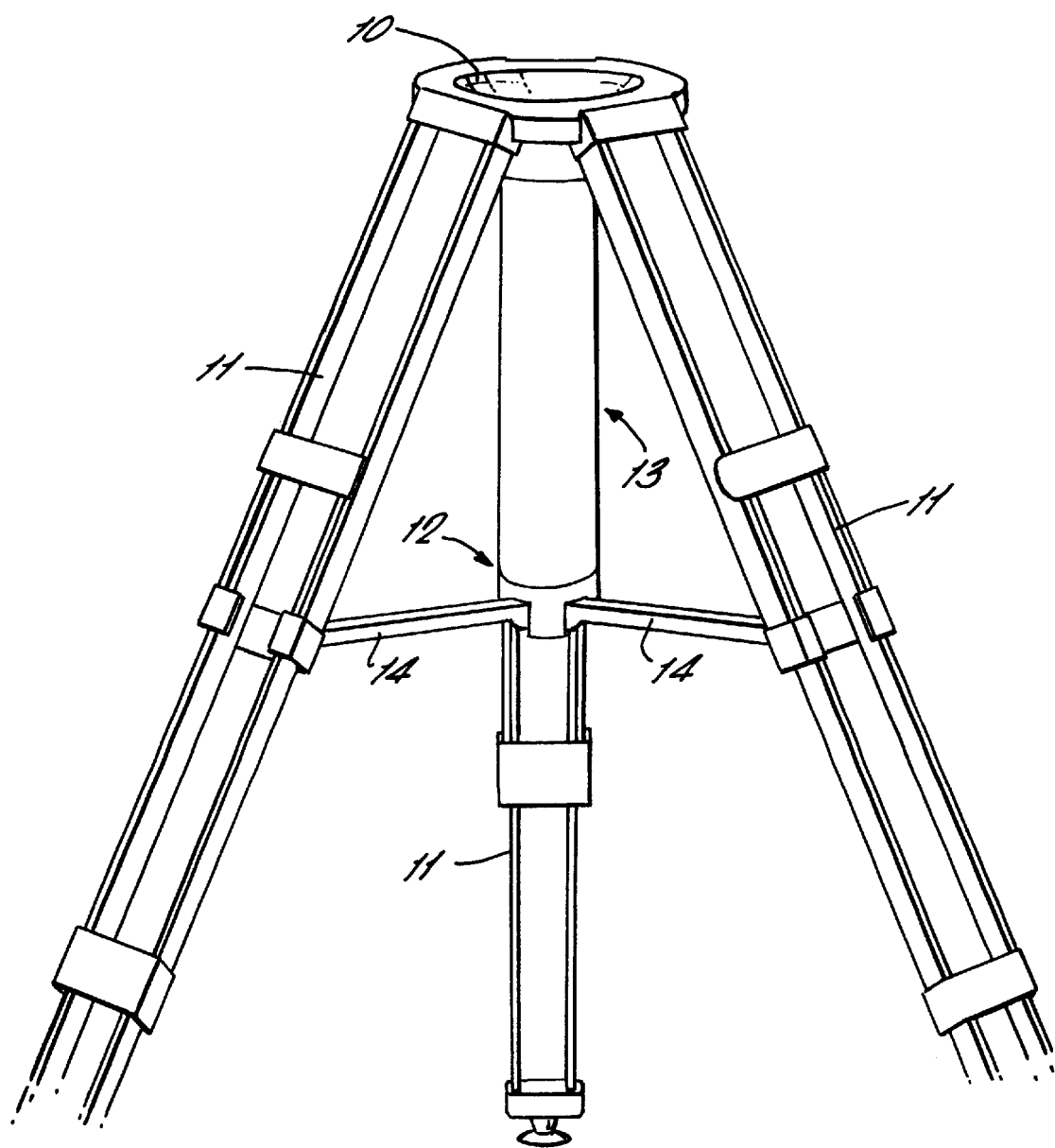

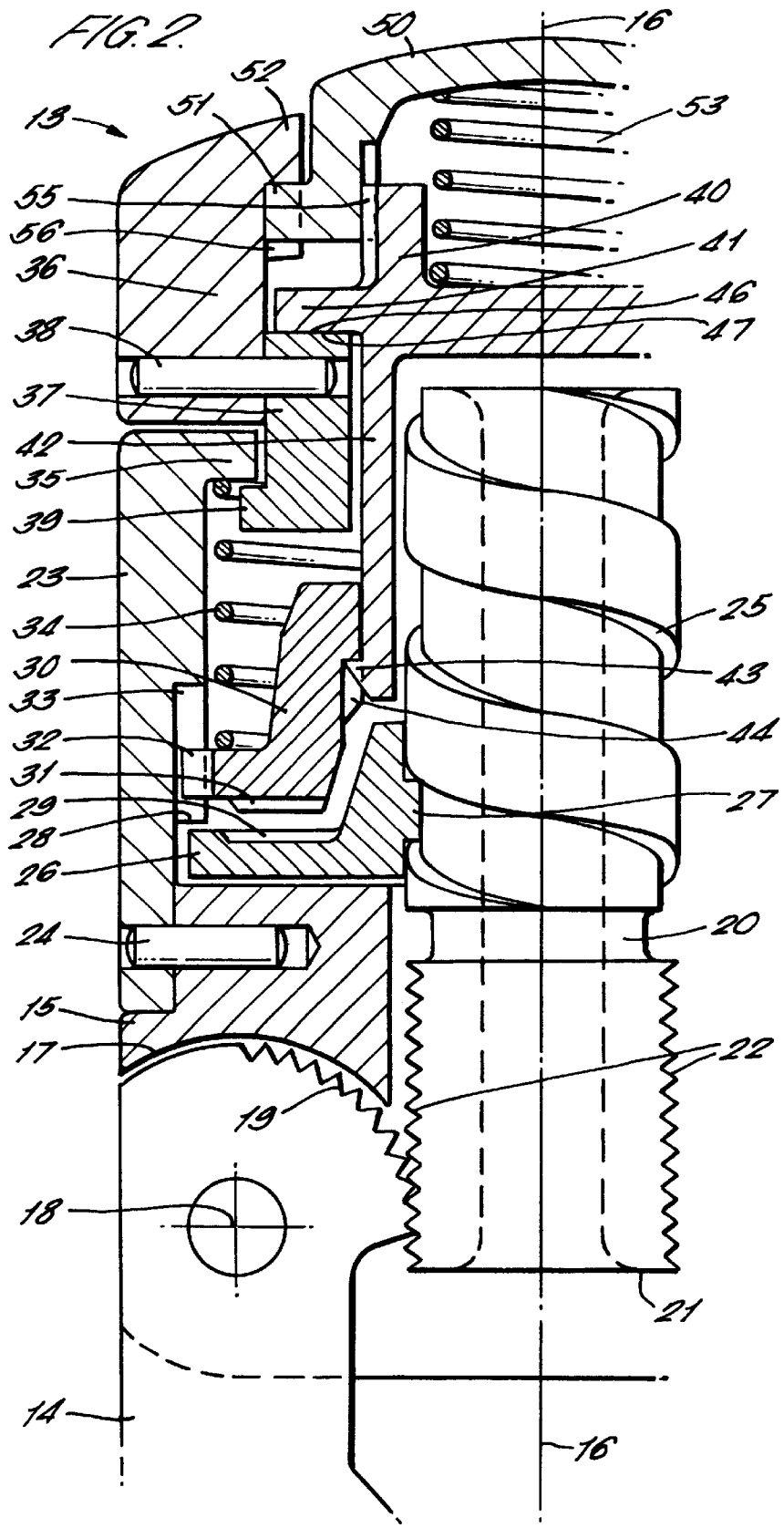

SPREADER MECHANISMS FOR SUPPORTING TRIPOD LEGS

This invention relates to spreader mechanisms for supporting the legs of a tripod erect and is particularly although not exclusively applicable to tripods for TV, video or cinematograph cameras.

Spreaders are used for fixing the spread of tripod legs particularly where the tripod is to be used on an even ground. Such spreaders comprise a central hub with three equi-spaced radiating arms which are fixed to the legs of the tripod. The spreaders can be attached to the lower most ends of the tripod legs or maybe attached to the tripod legs at an intermediate position. In particular where the tripod has extending legs, the spreader arms may be connected to the upper members of the extending legs. The hub is provided with a mechanism for controlling the angle of spread of the arms to suit the spread of the tripod legs. Our UK patent publication No. 2298570 discloses a tripod spreader mechanism in which the hub mechanism for the spreader arms coordinates the movement of the arms and has preset positions in which the arms can be locked at different angles to the hub to provide the extension required. That functionality required a complex mechanism which was costly to produce and it is an object of the present invention to provide a much simpler mechanism having a much wider range of potential positions of adjustment of the spreader arms.

This invention provides a spreader mechanism for supporting the legs of a tripod erect, comprising a hub having a central axis, three arms pivotally mounted on the hub at positions equi-spaced around the hub to swing with respect to the hub axis between extended and folded positions, a drive mechanism coordinating movement of the arms so that all three arms remain in the same relationship to the hub axis throughout the range of movement of the arms, a locking device for locking the drive mechanism against movement at any position throughout the range of movement of the arms, means to hold the locking device released to allow adjustment of the spreader member and means to deactivate the holding means to allow engagement of the locking device to lock the arms in a selected position of adjustment.

In a preferred arrangement the locking device includes a first annular member mounted for rotation in the hub about said central axis and drivably connected by said drive mechanism to said arms to be rotated by rotation of the arms and means for holding said member locked against rotation.

In one particular arrangement the drive mechanism coordinating movement of the arms may comprise a shaft mounted for linear movement along the hub axis and the locking device acts to lock the shaft against movement in the hub to lock the arms in a selected position.

More specifically the drive connection between the arms and shaft may comprise segmental gears on the arms and outwardly facing toothed racks on the shaft with which the gears are engageble whereby linear movement of the shaft causes rotary movement of the arms.

More specifically the first rotatable annular member of the locking device may encircle the shaft and may be constrained against axial movement in the hub, the annular member being in driving engagement with the shaft whereby linear movement of the shaft causes rotary movement of the annular member and brake means are mounted for linear movement on the hub parallel to the hub axis to engage and release the annular member to lock and release the shaft.

In a further arrangement the drive mechanism between the arms and said first annular member may comprise a helical gear on the annular member and part-helical gears on the arms meshing with the helical gear of the member.

In the above arrangements the means to engage and release the first annular member may comprise a second annular member mounted in the hub for axial sliding movement with respect to the hub axis but constrained against rotation in the hub, spring means being provided acting between the hub and the second annular member biassing the second and first annular members together to lock the first member against rotation with respect to the second member, said holding means comprising means for disengaging the second member from the first member.

More specifically the first and second annular members have serrations which interengage when the plates are together to lock the first plate against rotation with respect to the second plate.

Thus the holding means may comprise a rotary collar mounted on the hub and means actuated by the collar for lifting the second member out of engagement with the first member.

The hub may include a push button release for releasing the action of the holding means.

The following is a description of some specific embodiments in the invention, reference being made to the accompanying drawings in which:

FIG. 1 is a perspective view of tripod for a TV or video camera having a spreader mechanism for supporting the legs of the tripod when extended; and FIG. 2 is a cross-sectional view through a hub of the spreader mechanism. The arrangement is suitable for use with tripods of the type described and illustrated in our UK patent publication nos. 2259787, 2246600 and our UK patent application no. 9918968.

Referring firstly to FIG. 1 of the drawings, there is shown a tripod having a camera mounting bowl 10 with three telescopic legs 11 pivotally mounted on the bowl and foldable between collapsed and extended positions. In their extended positions, the legs are supported by a spreader mechanism indicated at 12 having a central hub 13 with three equi-spaced arms 14 radiating out from the hub the ends of which are connected to the lower ends of the upper most members of the telescopic legs of the tripod. The arms are locked in the hub so that the spreader effectively braces the legs of the tripod against uncontrolled spreading and stabilises the tripod particularly on uneven ground.

Reference will now be made to FIG. 2 of the drawings which illustrates the construction of the central hub 13 of the spreader mechanism. The hub comprises an annular base 15 having a central axis 16. The base has three downwardly open housings 17 spaced around the base in which the inner ends of the spreader arms 14a re rotatably mounted on pivots 18 mounted in the base. The inner end of each spreader arm is formed with a segmental gear 19 and a shaft 20 lies coaxially at the centre of the hub and has a lower triangular section extension 21 the sides of which are formed with toothed racks 22 with which the respective segmental gears 19 on the arms engage. Thus all of the arms are maintained at the same angle or orientation with respect to the hub at all times.

An annular housing 23 is mounted on the base 15 being attached to the base by studs 24. The housing encloses a braking mechanism for the shaft 20 which will be described in detail below.

The upper part of the shaft 20 is formed with a high efficiency wide thread 25 and the shaft is encircled by a first annular plate 26 formed with an inner tooth 27 which engages the threaded shaft. The annular plate 26 is constrained axially between the upper face of the base 15 and a downwardly facing shoulder 28 on the inner side of the housing 23 so that movement of the shaft 20 upwardly and downwardly with rotation of the arm 14 causes the annular plate 26 to rotate. The upper face of the annular plate 26 is formed with radial splines or serrations 29 and a second annular plate 30 disposed above annular plate 26 in the housing has corresponding serrations or splines 31 engageable with the splines of the plate 29. The plate 30 is axially movable in the hub but is constrained against rotation by means of a projection 32 on the outer periphery of the plate which engages in a vertical slot 33 in the side of the housing.

A coiled compression spring 34 acts between a flange 35 at the top of the housing and the upper face of the plate 30 to bias the plate downwardly to engage the splines 31 on the second plate with the corresponding splines 29 on the first plate to lock the plates together and thereby lock plate 26 against rotation. By the locking of the plate 26 against rotation shaft 20 is locked against vertical movement in the hub which thereby locks the arms 14 in a particular orientation.

A manually rotatable ring or bezel 36 is supported at the top of the housing 23 by an inner sleeve 37 to which the bezel is secured by a radial pin 38. The inner sleeve has an outwardly projecting shoulder 39 at its lower end which engages under an abutment 35 at the top of the housing 23. An inner sleeve 40 is mounted within the bezel 36 and has an integral encircling flange 41 which overlies the top of the sleeve 37. The inner sleeve 40 has dependent portion 42 with a projection 43 at its lower end which engages in a slot 44 in the second annular plate 30 so that the plate can be lifted out of engagement with the first plate 26 against the action of the spring 34 when it is desired to adjust the spreader arms with respect to the hub. Inter-acting cam faces 46,47 are provided on the the flange 41 and upper end of the sleeve 37 respectively which cause the inner sleeve 40 to be lifted with manual rotation of the bezel 36 in one direction to a release position in which plate 30 is disengaged from plate 26. Adjustment of spreader arms 14 can then be made whilst the bezel is held in the release position.

A push button 50 is mounted at the top of the hub having an outwardly projecting annular flange 51 which engages under a rim 52 of the bezel. The push button 50 is spring urged upwardly by a compression spring 53 acting between the underside of the push button and the inner sleeve 40. The inner side of the push button 50 is splined at 55 to the inner sleeve 40 to prevent rotation of the push button with respect to the sleeve.

Depressing the push button 50 disengages the projection 51 from a notch (not shown) in the bezel 36 allowing the bezel to rotate. The bezel can then be rotated from an engaged position into the release position to allow the spreader arms to be adjusted as required. The spring force provided by compression spring 34 is sufficient to rotate the bezel when released down the cam provided between faces 46 and 47 thereby allowing the second plate 30 to reengage its splines or serrations with the corresponding splines or serrations of the first plate 26 to relock the plates together. Thus the arms 14 of the hub can be locked in a preferred orientation with respect to the hub either in an extended position to support the legs of a tripod or in the collapsed condition when the tripod is collapsed. The bezel has end stops one of which can be seen at 56 which engage in a slot formed in flange 51 to define the limits of rotation for the "engaged" and "released" positions of the bezel with respect to the push button. The latter is prevented from rotating with respect to the base 15 by the various splined connections described.

It will be appreciated that other forms of mechanism may be provided for operating the hub. For example the arms may have part helical gears which engage a central helical gear attached directly to the annular member 26 to rotate the annular member with rotation of the arms.

What is claimed is:

1. A spreader mechanism for supporting the legs of a tripod erect, comprising a hub having a central axis, three arms pivotally mounted on the hub at positions equi-spaced around the hub to swing with respect to the hub axis between extended and folded positions, a drive mechanism coordinating movement of the arms so that all three arms remain in the same relationship to the hub axis throughout the range of movement of the arms, a locking device for locking the drive mechanism against movement at any position throughout the range of movement of the arms, means to hold the locking device released to allow adjustment of the spreader member and means to deactivate the holding means to allow engagement of the locking device to lock the arms in a selected position of adjustment.

2. A spreader mechanism as claimed in claim 1 wherein the locking device includes a first annular member mounted for rotation in the hub about said central axis and drivably connected by said drive mechanism to said arms to be rotated by rotation of the arms and means for holding said member locked against rotation.

3. A spreader mechanism as claimed in claim 1, wherein the drive mechanism coordinating movement of the arms comprises a shaft mounted for linear movement along the hub axis and the locking device acts to lock the shaft against movement in the hub to lock the arms in a selected position.

4. A spreader mechanism as claimed in claim 3, wherein the drive connection between the arms and shaft comprise segmental gears on the arms and outwardly facing toothed racks on the shaft with which the gears are engageble whereby linear movement of the shaft causes rotary movement of the arms.

5. A spreader mechanism as claimed in claim 3, wherein the first rotatable annular member of the locking device encircles the shaft and is constrained against axial movement in the hub, the annular member being in driving engagement with the shaft whereby linear movement of the shaft causes rotary movement of the annular member and brake means are mounted for linear movement on the hub parallel to the hub axis to engage and release the annular member to lock and release the shaft.

6. A spreader mechanism as claimed in claim 2, wherein the drive mechanism between the arms and said first annular member comprises a helical gear on the annular member and part-helical gears on the arms meshing with the helical gear of the member.

7. A spreader mechanism as claimed in claim 2, wherein the means to engage and release the first annular member comprise a second annular member mounted in the hub for axial sliding movement with respect to the hub axis but constrained against rotation in the hub, spring means being provided acting between the hub and the second annular member biassing the second and first annular members together to lock the first member against rotation with respect to the second member, said holding means comprising means for disengaging the second member from the first member.

8. A spreader mechanism as claimed in claim 7, wherein the first and second annular members have serrations which interengage when the plates are together to lock the first plate against rotation with respect to the second plate.

9. A spreader mechanism as claimed in claim 7, wherein the holding means comprise a rotary collar mounted on the hub and means actuated by the collar for lifting the second member out of engagement with the first member.

10. A spreader mechanism as claimed in claim 7, wherein the hub includes a push button release for releasing the action of the holding means.

* * * * *